Dec. 21, 1954     J. A. THOMAS ET AL     2,697,624
PORTABLE KNOT TYING DEVICE

Filed Nov. 3, 1951     2 Sheets-Sheet 1

INVENTORS
John A. Thomas.
Edwin W. Albrecht.
BY Frank C. Fearman.
ATTORNEY

Dec. 21, 1954   J. A. THOMAS ET AL   2,697,624
PORTABLE KNOT TYING DEVICE
Filed Nov. 3, 1951   2 Sheets-Sheet 2
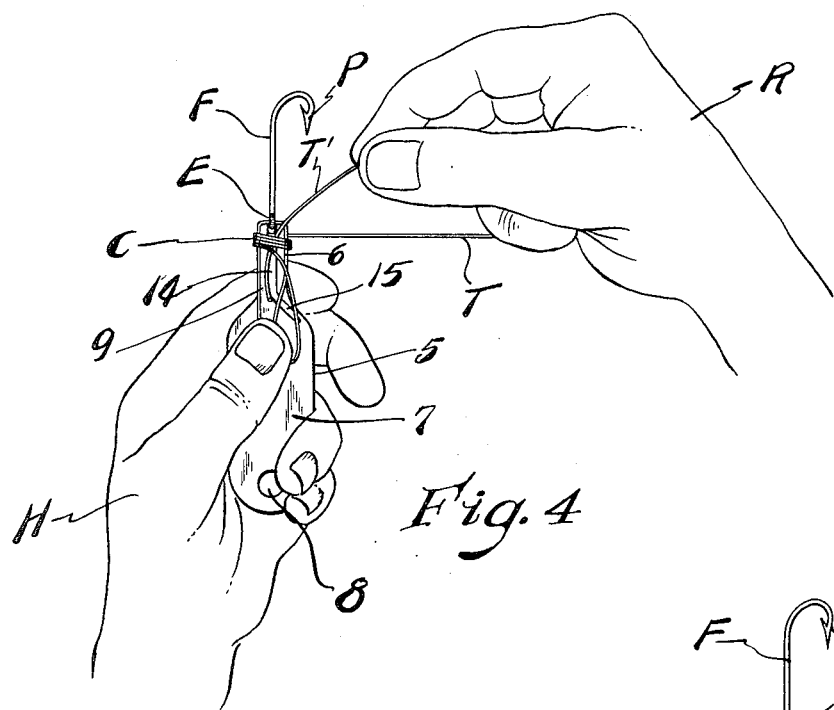
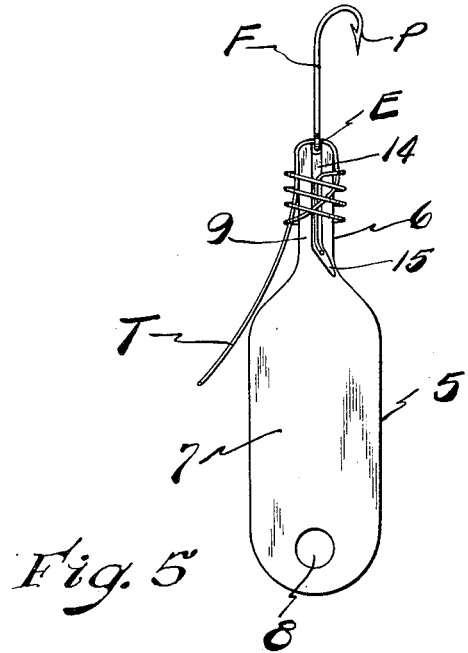
INVENTOR
John A. Thomas,
Edwin W. Albrecht,
BY Frank C. Kazman,
ATTORNEY United States Patent Office 2,697,624
Patented Dec. 21, 1954

2,697,624

PORTABLE KNOT TYING DEVICE

John A. Thomas, Bay City, and Edwin W. Albrecht, Saginaw, Mich.

Application November 3, 1951, Serial No. 254,664

4 Claims. (Cl. 289—17)

The present invention relates to tying implements, and more particularly to an implement for attaching leaders to fish hooks to provide in addition to the knot a short length of whipping to present a finished appearance when the leader line is affixed to the fish hook.

One object, is to provide an implement which can be conveniently manipulated to tie a fish leader line of gut, metal or nylon to a fish hook in making up certain fishing equipment without the user's fingers being damaged by the prong of the fish hook during the tying operation.

Another object, is to provide a typing implement which can be conveniently carried in the pocket or kit of the fisherman without consuming a large amount of space.

Another object is to provide a tying implement for tying a neat and attractive knot when connecting a fish hook to a leader line or to a swivel connection which will have the appearance of a manufactured product, and will not distract from the fish getting qualities of the fishing tackle.

Another object is to provide a manually operable tying implement which can be used for tightly affixing flies and artificial bait to the fish hook while the same is tied to the eye of the hook and to form a whipped shank portion on the leader line or other tying element to thereby strengthen the knot structure and provide a very tight, non-slip knot of finished appearance.

Another object is to provide a tying implement which can be conveniently manipulated to quickly and easily tie a knot when connecting a leader line to a fish hook or other pieces of fishing tackle such as swivel connections and the like so that various fishing tackle may be made up to suit the desire of the fisherman or user during his leisure.

Other objects and advantages of the invention will become apparent during the course of the following description of the accompanying drawings wherein.

Figure 1:
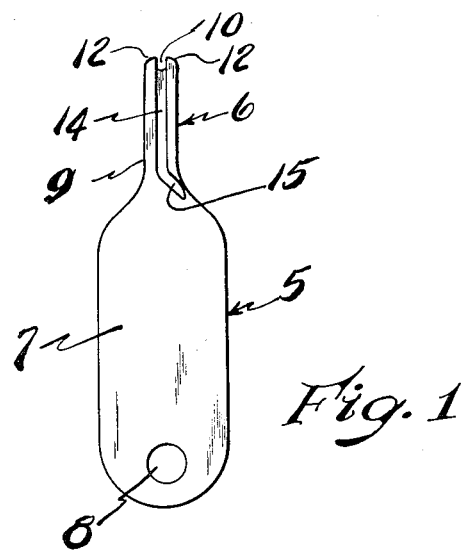
Figure 1 is a top elevational view of the tying implement showing the slot in the mandrel portion for receiving the free end of the tying element after the same has been passed through the eye of the hook and looped several times to form a short length of whipping.
Figure 3:
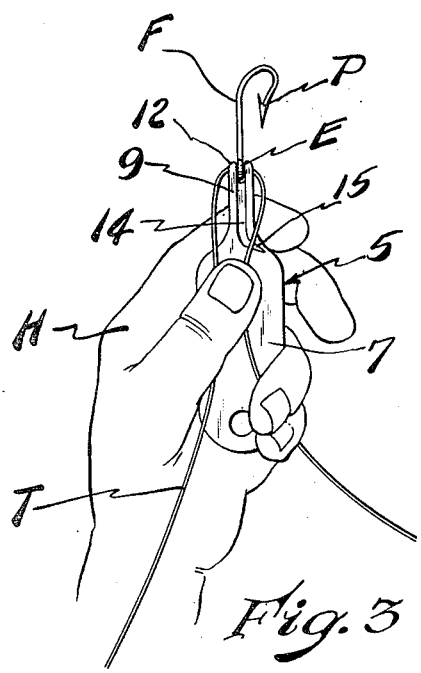
Figure 3 is a front elevational view of the tying implement showing the manner in which a fish hook is positioned with the eye received in the slot in the end of the mandrel during the initial tying operation.
Figure 2:
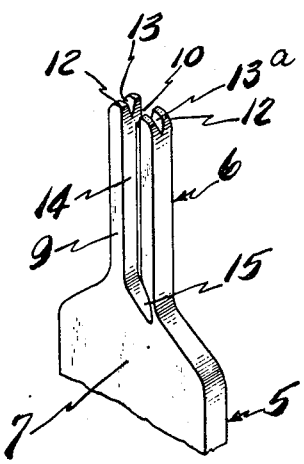
Figure 2 is an enlarged fragmentary perspective view of the tying implement showing the notched end portion thereof for receiving the eye of a fishing hook.

Figure 4 is a view similar to Figure 3, showing the manner in which the tying element is looped several times and finally inserted in the longitudinal slot and passed through the short length of whipping, and Figure 5 is a top elevational view of the tying implement showing the manner in which the free end of the tying element is passed through the slot in the mandrel in the final tying operation to form a complete knot.

In the drawings, and more in detail, there is shown a tying implement including a body portion generally designated 5 and a mandrel portion formed integral therewith and projecting from one end designated by the reference numeral 6. The body portion 5 includes a flat metal handle 7 having an opening 8 at one end adapted to receive a keyring or the like for pocket and personal use. The opposite end of the body portion 5 is reduced to form an elongated mandrel 9 having a fish hook receiving notch in the end thereof as at 10 extending in a transverse direction to the mandrel 9.

The mandrel 9 is of rectangular cross-section; it is outwardly tapered and the edges may be rounded slightly to permit the knot to be readily removed after the tying element has been affixed to the fish hook. The outer corner edges of the mandrel are rounded as at 12 to further permit easy sliding removal of the knot structure after the same has been formed. Formed in the end of the mandrel 9 and at right angles to the slot 10 is a pair of tying element receiving notches 13 and 13a which together intersect the notch 10.

Formed in the mandrel 9 and extending from the outer or slotted end 10 to the body portion 7 is a slotted recess 14 which extends inwardly for a portion of its length and terminates in an angular slotted portion 15 offset in an oblique direction from the inwardly extending slot 14, the slotted recess being slightly undercut so that the tying element readily follows therein during the tying operation.

The tying implement is formed of aluminum or other non-corroding metal, which will not become effected from moisture conditions during use, and the thickness of the body and mandrel portions 5 and 6 respectively is such as to provide a rigid implement which will not readily bend during the tying operation. Thus, the tying element can be drawn taut without causing damage to the implement such as bending and the like.

In operation, a fishing line leader T or other flexible tying element formed of gut, metal or nylon is threaded through the eye E of a conventional fish hook F having a barbed point P. After the tying element T has been threaded through the eye E of the fish hook the handle 7 of the implement is grasped in the hand H of the fisherman or user and the eye E of the fish hook is inserted in the notch 10 in the end of the mandrel 9 with the tying element T received in the notches 13 and 13a and held in place by the thumb of the user's hand H (Fig. 3). The user may hold the tying implement in his hand H with the forefinger positioned under the mandrel 9 and his thumb placed on top of the body portion 5 with the tying element T, and the free end thereof temporarily held in the position shown in Fig. 3.

After the tying element T and fish hook F have been positioned as shown in Fig. 3, the free end of the tying element is brought forward with the right hand and wrapped around the mandrel 9 as well as the looped portion of the tying element passing through the eye of the fish hook. During the formation of several convolutions the ends of the loop portion of the tying elements are held by the thumb. The convolutions forming whipping in the finished knot which is tied in a manner which will be hereinafter described.

When forming the whipping or convolutions the free end of the tying element is wrapped tightly about the mandrel 9 and the extreme free end is then passed rearwardly through the elongated recess 14 so as to pass through the convolutions of the tying element on the mandrel 9. Since the tying element is formed of gut, wire or nylon it will pass freely through the slot or recess 14 and will emerge at the oblique end 15 of the slot 14. After the desired number of convolutions C have been formed and the free end T' of the tying element passed through the slot 14, as shown in Fig. 4, it is passed through the loop held by the thumb of the user's hand H by inserting the same with the user's right hand R (Fig. 4). The extreme free end of the tying element T as at T' after being passed through the convolutions C, is pulled tightly to cause the convolutions C to be wrapped tightly about the mandrel 9 and cause the loop formerly held by the thumb to be pulled into the knot structure.

After the knot structure has thus been formed, the convolutions C are pushed off of the free end of the mandrel 9 by the thumb of the user's hand H and the tying element when free of the mandrel is pulled tightly while the knot is held to cause the convolutions to become tightly wrapped about the looped ends of the tying element. The knot can be manipulated so that the convolutions are in close relation to form whipping for a short length of the knot structure and present a finished appearance.

When affixing leader lines to swivel connections of various pieces of fishing tackle such as artificial baits and the like, the eye of the swivel connection is inserted in the notch 10 in substantially the same manner as the eye of the fish hook E. In all cases, however, the free end T' of the leader line or other tying element is passed through the loop grasped by the thumb shown in Fig. 4 after the free end has been passed through the elongated slot or recess 14. This forms a tight knot and prevents the leader line from pulling free and the whipping formed by the convolutions C from unraveling and becoming displaced.

When tying leaders to hooks having offset eyes, the position of the hook is reversed; that is, the shank of the hook is placed in the slot 14, with the eye E located in the notch 10, and the barbed end P overhanging the mandrel. The knot is then tied in the same manner as previously described, and the finished whipping will then be located on the upper end of the fish hook F, the eye E serving as a stop. The implement requires no change whatsoever, and the knot will be firm and tight.

The tying implement can be conveniently used by fishermen and others for tying knots on other fishing tackle in a minimum amount of time, and with considerable ease without the danger of the pointed end P of the fish hook pricking the fingers of the user.

It is to be understood that the form of the invention herewith shown and described is to be taken as a preferred embodiment thereof, and that various changes in the shape, size and arrangement of parts may be resorted to without departing from the spirit of the invention or the scope of the subjoined claims.

What I claim is:

1. In a tying implement for knotting a flexible strand in the eye of a piece of fishing tackle, a body portion forming a handle, a mandrel extending from said body portion and having an open, longitudinal groove formed therein, said mandrel being provided in its end with a transversely extending eye-receiving notch communicating with and constituting a continuation of said groove, said mandrel having also a passage extending at substantially right angles to said notch substantially traversing the end of said mandrel and said eye-receiving notch for receiving the strand when the strand has been threaded through said eye, whereby the free end of the strand may be coiled about itself and the mandrel and passed through said groove to form a knot structure when removed from said mandrel.

2. In a tying implement for knotting a flexible strand in the eye of a piece of fishing tackle, a body portion forming a handle, a mandrel extending from said body portion and having a longitudinal groove formed therein open at both ends thereof to one face of said mandrel, said mandrel being provided at its end with a transversely extending eye-receiving notch, said mandrel having also a passage in the end thereof extending at substantially right angles to said notch, said passage in the mandrel traversing said eye-receiving notch for receiving the strand when the strand has been threaded through said eye, whereby the free end of the strand may be coiled about itself and the mandrel and passed through said groove to form a knot structure when removed from said mandrel.

3. In a tying implement for knotting a flexible strand in the eye of a piece of fishing tackle, a body portion forming a handle, a mandrel extending from said body portion and having a longitudinal groove formed therein open to one face of said mandrel and terminating at its inner end in an oblique portion, the mandrel being provided at its end with a transversely extending, eye-receiving notch communicating with said groove and constituting a continuation thereof, said mandrel having a notch at substantially right angles thereto substantially traversing the end of said mandrel and said eye-receiving notch for receiving the strand when the strand has been threaded through said eye, whereby the free end of the strand may be coiled about itself and the mandrel and passed through said groove to form a knot structure when removed from said mandrel.

4. In a tying implement for knotting a flexible strand in the eye of a piece of fishing tackle, a mandrel having a strand-receiving longitudinal groove open at both ends thereof to one face of said mandrel, said mandrel being provided at its end with a transversely extending, eye-receiving notch, said mandrel having also a passage in the end thereof extending at substantially right-angles to said notch and communicating therewith, said passage including a portion leading to said eye-receiving notch to permit passage of said strand thereto and another portion leading from said notch for receiving the strand when the strand has been threaded through said eye.

References Cited in the file of this patent

UNITED STATES PATENTS

| Number | Name | Date |
|---|---|---|
| 1,108,172 | Hirth | Aug. 25, 1914 |
| 1,452,906 | Butler et al. | Apr. 24, 1923 |
| 1,522,571 | Becker | Jan. 13, 1925 |
| 2,488,414 | King | Nov. 15, 1949 |
| 2,491,702 | Arnold | Dec. 20, 1949 |